(12) United States Patent
Kahler et al.

(10) Patent No.: US 8,300,831 B2
(45) Date of Patent: Oct. 30, 2012

(54) REDUNDANT KEY SERVER ENCRYPTION ENVIRONMENT

(75) Inventors: David Ray Kahler, Tucson, AZ (US); Anjul Mathur, Tucson, AZ (US); Richard Anthony Ripberger, Tucson, AZ (US); Jacob Lee Sheppard, Gilbert, AZ (US); Glen Alan Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 12/767,723

(22) Filed: Apr. 26, 2010

(65) Prior Publication Data

US 2011/0261964 A1  Oct. 27, 2011

(51) Int. Cl.
*H04L 9/00* (2006.01)
(52) U.S. Cl. ........ 380/286; 380/277; 380/278; 380/279; 380/281; 380/282; 713/189
(58) Field of Classification Search .................... 380/286
See application file for complete search history.

(56) References Cited

U.S. PATENT DOCUMENTS

| | | | | |
|---|---|---|---|---|
| 5,557,346 | A * | 9/1996 | Lipner et al. .................. | 380/286 |
| 5,737,419 | A * | 4/1998 | Ganesan ........................ | 713/169 |
| 5,841,865 | A * | 11/1998 | Sudia ............................ | 380/286 |
| 6,229,894 | B1 | 5/2001 | Van Oorschot et al. | |
| 6,266,421 | B1 * | 7/2001 | Domyo et al. ................ | 380/286 |
| 7,477,748 | B2 | 1/2009 | Schmidt | |
| 2001/0036276 | A1 * | 11/2001 | Ober et al. .................... | 380/286 |
| 2003/0012386 | A1 * | 1/2003 | Kim et al. ..................... | 380/286 |
| 2006/0034457 | A1 | 2/2006 | Damgaard et al. | |
| 2006/0291664 | A1 | 12/2006 | Suarez et al. | |
| 2008/0063209 | A1 | 3/2008 | Jaquette et al. | |
| 2008/0065889 | A1 | 3/2008 | Greco et al. | |
| 2008/0080708 | A1 | 4/2008 | McAlister et al. | |
| 2008/0253571 | A1 | 10/2008 | Rits | |
| 2008/0273697 | A1 | 11/2008 | Greco et al. | |

(Continued)

OTHER PUBLICATIONS

"IBM System Storage: Notice Regarding Storage Encryption", IBM Corporation, Jun. 2009.

(Continued)

*Primary Examiner* — Ponnoreay Pich
(74) *Attorney, Agent, or Firm* — David W. Victor; Konrad Raynes & Victor LLP

(57) ABSTRACT

Provided are a computer program product, system and method for a redundant key server encryption environment. A key server transmits public keys associated with the key server and at least one device to at least one remote key server. The key server receives from the at least one remote key server public keys associated with the at least one remote key server. The key server receives a request for an encryption key from a requesting device comprising one of the at least one device and generates the encryption key for use by the requesting device to unlock a storage. The key server generates a first wrapped encryption key by encrypting the encryption key with a requesting device public key associated with the requesting device. The key server generates a second wrapped encryption key by encrypting the encryption key with a public key associated with the key server. At least one additional wrapped encryption key is generated for each of the at least one remote key server by encrypting the encryption key with the at least one public key provided by the at least one remote key server. The key server transmits the first, second and the at least one additional wrapped encryption key to the requesting device.

22 Claims, 6 Drawing Sheets

U.S. PATENT DOCUMENTS

2008/0294906 A1  11/2008  Chang et al.

OTHER PUBLICATIONS

R. Ripberger, "IBM Encrypted Storage Overview and Customer Requirements", IBM Corporation, Document ID WP101479, Dec. 2009.

U.S. Appl. No. 13/453,730, filed Apr. 26, 2012, entitled "Redundant Key Server Encryption Environment" by inventors D.R. Kahler, A. Mathur, R.A. Ripberger, J.L. Sheppard and G.A. Jaquette.

Preliminary Amendment filed Apr. 23, 2012 for U.S. Appl. No. 13/453,730, filed Apr. 26, 2012, entitled "Redundant Key Server Encryption Environment" by inventors D.R. Kahler, A. Mathur, R.A. Ripberger, J.L. Sheppard and G.A. Jaquette.

* cited by examiner

REDUNDANT KEY SERVER ENCRYPTION ENVIRONMENT

BACKGROUND OF THE INVENTION

1. Field of the Invention

The present invention relates to a computer program product, system and method for a redundant key server encryption environment.

2. Description of the Related Art

In certain encryption environments, storage subsystems may request a symmetric key from a key server and then use that symmetric key to unlock a disk drive or use the symmetric key to encrypt and decrypt data to tape. Using a graphical interface or command line, the customer first configures the key server with an asymmetric key pair and an associated key label comprising text. The customer may then enter in a key label comprising text using a graphical interface or command line as input to an encryption group create operation on the storage device. In response to a request from the subsystem for the symmetric key that is part of the encryption group create command, the key server generates the encryption key and provides the storage subsystem the encryption key encrypted with the storage subsystem's public key, which the storage subsystem can decrypt with the corresponding private key of an asymmetric key pair. The key server also provides the storage subsystem with a copy of the encryption key encrypted by the public key the key server previously generated for the key label, which the storage subsystem cannot decrypt. The storage subsystem public key is transient or ephemeral, as determined by a key lifecycle manager. The storage subsystem stores the encryption key encrypted with the key label private key and the key label in the key repository which resides as a persistent file on the storage subsystem initialization disk. The encryption key is stored in the memory and available for use until a cluster reboot, in which case it is erased from memory. To later access the storage after reboot or a power cycle event, the storage subsystem would send the key server the encryption key encrypted with the key label public key for the key server to decrypt. The key server would then send to the storage subsystem the encryption key encrypted with the storage subsystem public key which the storage subsystem decrypts with the storage subsystem private key to obtain the encryption key.

Two companies may want to securely export data between their companies on removable media. To export data from company A to company B, company B configures an asymmetric key pair with key label B on its key server and provides the public key and key label to company A. Company A then configures that public key with key label B on his key server. Company A has also previously configured an asymmetric key pair and key label A on his key server for the purposes of managing his own encrypted storage. Company A then configures a storage device with both key labels A and B. If a sending storage subsystem at company A wants to export the data in storage to a receiving storage subsystem at company B, then the sending storage subsystem provides to the Company A key server the company A and company B key labels in the request for the symmetric encryption key used to encrypt the exported data. The key server would then provide to the sending storage subsystem the two copies of the encryption key that can be used to decrypt the exported data, one encrypted with the company A key label public key and another encrypted with the company B key label. The sending storage subsystem stores both of these encryption keys encrypted with the A and B key labels on the removable medium. To access the exported storage, the receiving storage subsystem would send the company B key server the key label B with the encryption key encrypted with the public key of key label B to decrypt using the private key of the key label B, and then encrypt with the receiving storage subsystem's public key to return to the receiving storage subsystem to use. Transfer of data from company B to company A is handled equivalently by company A providing a key label and public key to company B. In this way, the public parts of the key label pairs are interchanged between the sending and the receiving companies, but the private part of the key pairs are not interchanged.

An encryption deadlock situation may occur when all key servers within a computing environment are rendered inoperable because key server data is stored on an encryption storage device that is dependent on the key server to access the data (i.e., the encryption keys themselves have been included within the data that was encrypted using those keys).

If an encryption deadlock occurs, then the key servers may not be able to complete their initial program load (IPL) and become operational or may not be able to provide key services to storage subsystems. The required code and data objects includes not only the boot image and application image for the operating system that runs on the key server, but also any other data required by that operating system and their associated software stacks to run the key server application, to allow the key server to access its key store and communicate with storage clients. While an encryption deadlock exists, the customer is unable to access any encrypted data on the encrypted storage. If the possible key server instances are in encryption deadlock, then the customer cannot obtain the keys needed to decrypt attached storage, and the encryption deadlock can become a permanent encryption deadlock such that all encrypted data managed by the key servers is permanently lost, which can have substantially detrimental effects to the business whose data is now inaccessible.

SUMMARY

Provided are a computer program product, system and method for a redundant key server encryption environment. A key server transmits public keys associated with the key server and at least one device to at least one remote key server. The key server receives from the at least one remote key server public keys associated with the at least one remote key server. The key server receives a request for an encryption key from a requesting device comprising one of the at least one device and generates the encryption key for use by the requesting device to unlock a storage. The key server generates a first wrapped encryption key by encrypting the encryption key with a requesting device public key associated with the requesting device. The key server generates a second wrapped encryption key by encrypting the encryption key with a public key associated with the key server. At least one additional wrapped encryption key is generated for each of the at least one remote key server by encrypting the encryption key with the at least one public key provided by the at least one remote key server. The key server transmits the first, second and the at least one additional wrapped encryption key to the requesting device.

Provided are a computer program product, system and method for a redundant key server encryption environment. A device sends an encryption key request for an encryption key to use to a selected key server comprising one of the at least two key servers. The device receives from the selected key server, a first wrapped encryption key comprising an encryption key encrypted with a device public key for which the device has a device private key to decrypt data encrypted with the device public key, a second wrapped encryption key comprising the encryption key encrypted with a public key for which the selected key server maintains a corresponding private key, and at least one additional wrapped encryption key encrypted with a public key for which the key server other than the selected key server has a corresponding key server private key. The device decrypts the first wrapped encryption key to obtain the encryption key decrypted to use for encryption operations.

DETAILED DESCRIPTION

Figure 1:
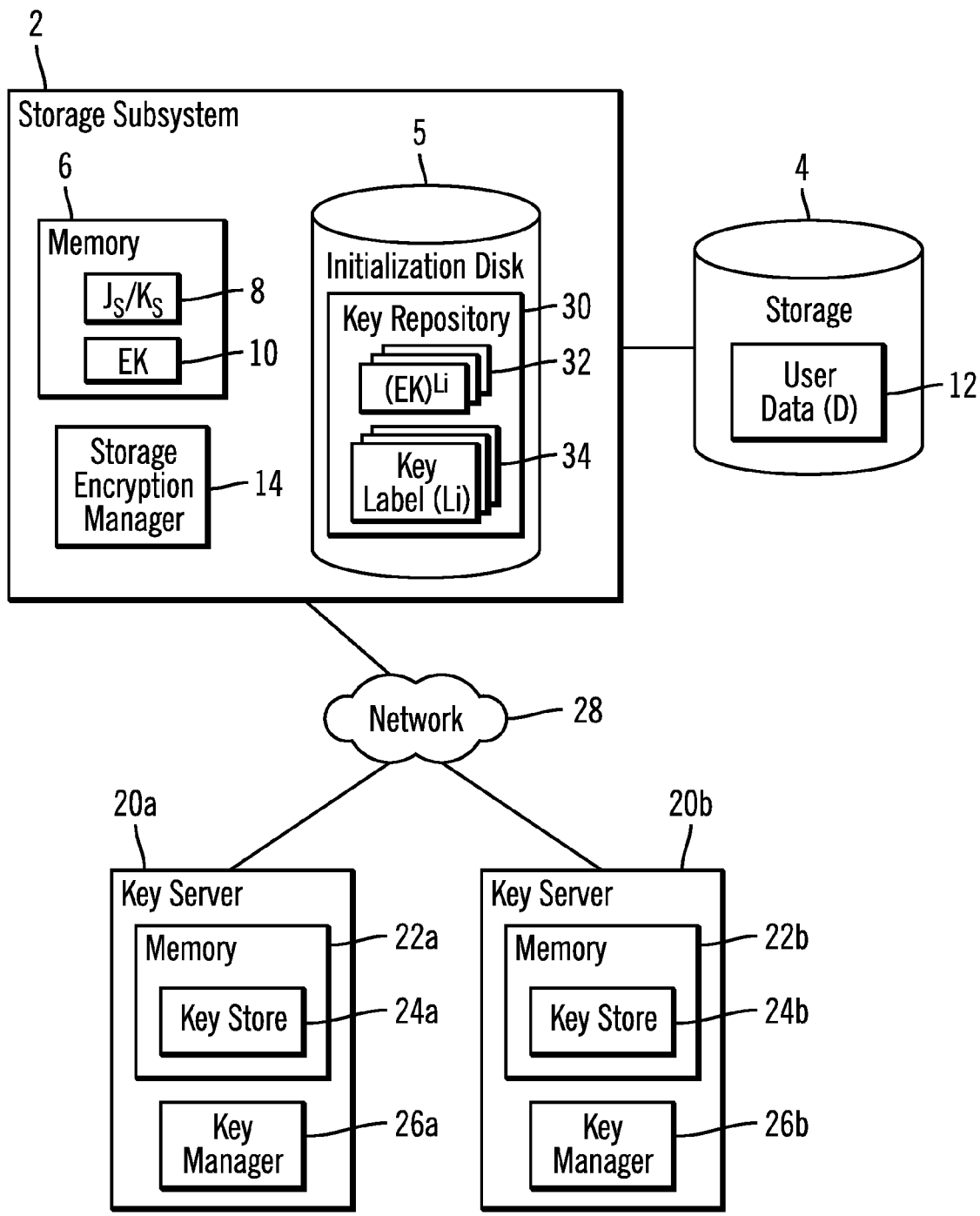
FIG. 1 illustrates an embodiment of a computing environment.

FIG. 1 illustrates an embodiment of a computing environment having a storage subsystem 2 managing access to a storage 4 and initialization disk 5. The storage subsystem 2 includes a memory 6. Operating system and storage encryption management code is loaded into memory 6 from the initialization disk at system initialization time. The memory 6 further stores an asymmetric public/private key pair ($J_S/K_S$) 8 generated for the storage subsystem 2 for communications and an encryption key (EK) 10 that is used to lock and unlock the storage 4. A public key is denoted by "K" and a private key is denoted by "J". On power-off or reset, the encrypted storage 4 becomes locked. On storage 4 initialization, the encryption key 10 is retrieved from a key server 20a, 20b and is indirectly used to unlock the encrypted storage 4. Once the storage 4 is unlocked, the storage 4 device may decrypt and encrypt the data 12 using its own internal key. In one embodiment, the encryption key (EK) 10 may comprise a symmetric encryption key that is used to lock and unlock the storage 4.

In one embodiment, the initialization disk may comprise an AIX® boot disk. The operating system and kernel extensions are stored on the boot disk. (AIX is a registered trademark of International Business Machines Corporation in the United States and other countries). When a reboot occurs, the operating system code is read from the boot disk and loaded into the memory 6. The storage encryption manager 14 may be part of a kernel extension loaded into the memory 6 during system initialization. The key repository 30 data files also reside on this disk. In certain embodiments, there may be two mirrored boot disks on each processing node of the subsystem and/or there may be two or more processing nodes per subsystem to provide redundant copies of the key repository.

In certain embodiments, the encryption key (EK) 10 is maintained in a transient or volatile memory, such as memory 6, and is unavailable after a power cycle event. The encryption key (EK) 10 is retrieved after the power-on or initialization. The storage subsystem 2 includes a storage encryption manager 14 for managing the key repository 30, managing the acquisition of the encryption key from one of the key servers, and using the encryption key to unlock the user disks. The storage encryption manager 14 includes encryption services for interacting with key servers and performing encryption related operations.

The storage subsystem 2 utilizes key services provided by at least two key servers 20a, 20b. Each key server 20a, 20b includes a memory 22a, 22b and a key store 24a, 24b storing generated public/private key pairs as well as public keys provided by other key servers. The key store 24a, 24b is stored in a persistent non-volatile storage and may be copied, in part or in full, into memory as required to respond to key server requests from storage subsystems. The key servers 20a, 20b include key managers 26a, 26b to perform key related operations. The key servers 20a, 20b and storage subsystem 2 may communicate over a network 28 or be directly connected or operate within the same device.

Figure 2:
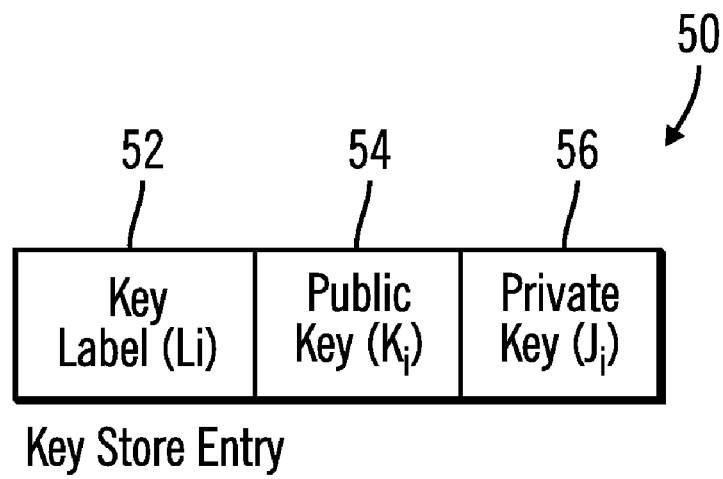
FIG. 2 illustrates an embodiment of a key store entry maintained in the key server key store.

As shown in FIG. 2, the key managers 20a, 20b configure the public/private key pairs (Ji/Ki) associated with the key labels (Li) in the key store 24a, 24b prior to the key request from the subsystem 4. The key labels (Li) may comprise a user specified string that is provided when the user configures the key label on the key server and when the user configures the storage subsystem 2 to communicate with the key server. The storage subsystem 2 public key (Js) is passed to the key server 20a, 20b at the beginning of a communication session initiated by the storage subsystem with a key server. The public key (Js) is used to encrypt the encryption key (EK) sent by the key server so that it can be transferred securely to the storage subsystem which can then decrypt the encrypted encryption key with its private key (Ks). In one embodiment, the storage subsystem public/private key pair is destroyed and replaced with a newly generated key pair (J's/K's) after each key server communication session.

The storage encryption manager requests a new encryption key when a key label is configured on the storage subsystem. The request provides the one or more key labels (Li) configured on the storage subsystem and the storage subsystem public key (Js) to the key server. In response, the key manager generates a new symmetric encryption key (EK) and then sends independent copies of this encryption key to the storage subsystem, one copy $(EK)^{Js}$ encrypted with the storage subsystem's public key (Js) and one copy (EK)Li for each key label (Li) transmitted in the request, each copy encrypted with the associated key label's public key (Ji). The storage encryption manager decrypts the first copy using the storage subsystem's private key (Ks) and keeps a copy of the resulting encryption key (EK) in memory, using this key to manage the locking and unlocking of storage disks. It also stores all other encrypted copies (EK)Li in they key repository, each with its associated key label (Li), for use in future key server requests to decrypt the existing encryption key. The storage encryption manager 14 may store the received key labels (Li) 32 and their associated encrypted encryption keys $(EK)^{Li}$ in a key repository 30 stored in an initialization disk 5.

After a power loss or reboot, the storage subsystem loses the copy of the encryption key in memory. Also after a power loss the storage disks become locked, but the initialization disk 5 having the key repository 30 is accessible so that the storage encryption manager 14 can obtain the encrypted encryption keys necessary to make a key server request.

Following a power on or a reboot, the storage encryption manager requests the decryption of the existing encrypted encryption keys stored in the key repository in order to obtain the lost encryption key. In the key server request, it provides the previously stored key label (Li) and encrypted encryption key (EK)Li pairs to the key server along with the storage subsystem public key (Js). The key manager uses at least one of the key labels (Li) in the request to locate a corresponding key label (Li) which has an associated private key (Ki) in the key server's key store. If found, the key manager uses the key label's private key (Ki) to decrypt the encrypted encryption key (EK)Li producing the encryption key (EK). Subsequently, the key manager encrypts the encryption key (EK) with the storage subsystems public key (Js) and returns this to the storage encryption manager, which then decrypts it using the storage subsystem's private key (Ks) to obtain the encryption key (EK).

A set of conditions to provide N redundant key servers across K key server platforms that do not support exchange of private keys between platforms is the following:

1) The storage subsystem is configured with a means to communicate with the N key servers. In one embodiment consisting of a network attachment, such means consists of configuring the storage subsystem with the IP address of each of the key servers. In one embodiment, the communication mechanism is redundant such that no single failure causes the loss of ability to communicate with any key server. In one embodiment, the redundant communication mechanism consists of configuring at least two network ports on the storage subsystems and key servers such that one port on each unit communicates through one of two redundant network fabrics such that the loss of any one network port or of one of the two network fabrics does not prevent the storage subsystem from being able to communicate with any key server.
2) The storage subsystem is configured with K key labels and uses those key labels in key server requests with all its configured key servers.
3) The N key servers which the storage subsystem is configured to communicate with are all configured with the same K key labels that are configured on the storage subsystem where each of the K key labels (Lk) have the same associated public key (Jk) and where at least one key label on each key server has the private key (Kk). In effect there is one key label (Lk) with an associated public/private key (Jk/Kk) that is shared between the set of key servers deployed on each one of the K key sever platforms.
4) The storage subsystem is designed to attempt to request key services from any one of the key servers such that, if a requests fails, it continues to make requests on the other configured key servers until at least one of the key servers responses successfully to the request.

As described, all N key servers are capable of processing a request to generate a new encryption key since they all have the necessary key labels and public keys (J1-Jk) to generate the encrypted encryption keys ((EK)$^{L1}$-(EK)$^{Lk}$). Also all key servers are capable of processing a request to decrypt an existing encrypted encryption key since each key server has at least one of the private keys (Ji). As such, each key server is independently able to service any key server request from the storage device and, as a result, there are N redundant key servers.

In order to monitor the available redundancy of the configuration, the storage subsystem may attempt to communicate with the N key servers at times other than when key server requests are necessary to manage access to the storage devices. In one embodiment, the communication to monitor available redundancy is performed periodically. In one embodiment, the communication consists of validating that the key server is still available for communication over the attachment interface. In one embodiment, the communication consists of validating that the key server is still capable of responding to key server requests for the K key labels configured on the storage device, thereby validating that the key labels are still configured in the key server's key store. In one embodiment, the communication requests the key server to unwrap the existing encrypted encryption keys and the response is checked to ensure that the encryption key returned in the request matches the existing encryption key in memory. In one embodiment, a failure to complete the communication on any key server is reported to the customer via a notification mechanism such as an SNMP trap or email.

The storage subsystem 2 may comprise a server, disk subsystem, tape subsystem, storage drive, tape drive, etc, for managing access to a coupled storage 4. The storage 4 and initialization disk 5 may be comprised of one or more storage devices, such as a solid state device comprised of solid state electronics, such as an EEPROM (Electrically Erasable Programmable Read-Only Memory), flash memory, flash disk, etc., magnetic storage disk, optical disk, tape, etc. The memory 6 may comprise a volatile or transient memory device temporarily storing information and keys during operations. The key servers 20a, 20b may comprise separate platforms or systems, such as an appliance or key server programmable computer having different operating systems and key manager programs. The key managers 20a, 20b and storage encryption manager 14 may be implemented with hardware logic, such as an Application Specific Integrated Circuit (ASIC), or as a programmable processor executing code in a computer readable storage medium.

FIG. 1 shows one storage subsystem 2 and two key servers 20a, 20b. In further embodiments, the computing environment may include multiple storage subsystems coupled to additional storages performing the operations of storage subsystem 2 and include more than two key servers. Further, the device requesting the wrapped encryption keys from the key servers 20a, 20b may comprise the storage subsystem 2 or other suitable devices requiring encrypted exchange with a key server for keys to use to encrypt and decrypt data.

FIG. 2 illustrates an embodiment of a key store entry 50 maintained in the key stores 24a, 24b. A key store entry 50 includes a key label (Li) 52, the asymmetric key pair comprising the public key (K) 54 and the private key (J) 56 associated with the key label (Li) 52. The number "i" as used herein with a variable, e.g., Li, Ki, Ji, denotes any numbered instance of the item represented by the variable. The key store entry 52 may not include a private key (J) 56 if the key label and associated public key were received from another key server as part of key label exchange operation. In certain embodiments, the key managers 26a, 26b maintain the public and private key pairs for encryption keys they generate secretly from other key servers and other devices, but share the public keys for the key labels. Further, encrypting the decrypted encryption key with the public key (Ks) of the storage subsystem 2 that provided the key label (Li) ensures that only the storage subsystem 2 that requested to generate the encryption key can access the encryption key (EK) 10 wrapped in the storage subsystem 2 public key (Ks).

Figure 3:
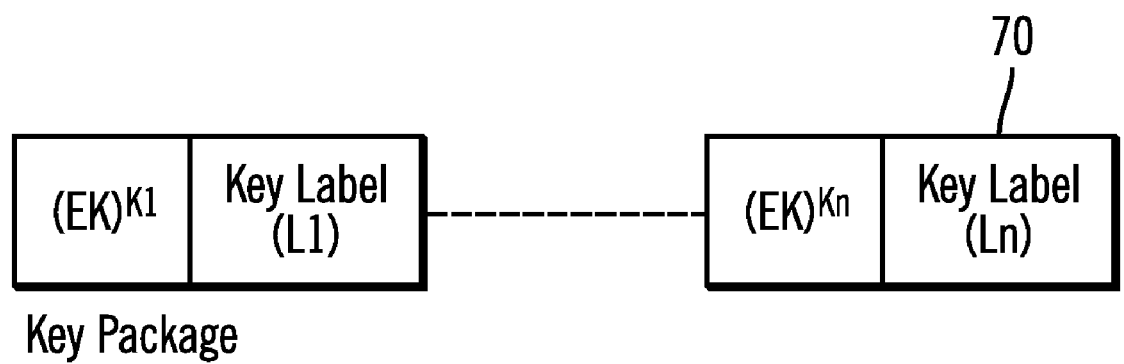
FIG. 3 illustrates an embodiment of a key package including wrapped encryption keys sent to the key servers to obtain the encryption key.

When the storage encryption manager 14 needs the encryption key (EK) 10 to unlock the storage 4, the storage encryption manager 14 sends a key package to one or more of the key servers 20a, 20b including the wrapped encryption keys $(EK)^{Ki}$ in the key repository 30. FIG. 3 illustrates an embodiment of a key package 70 sent by the storage encryption manager 14 comprising each encryption key $(EK)^{Ki}$ ... $(EK)^{Kn}$ and the key labels (Li ... Ln) maintained in the key repository 30 that were received from the key servers 20a, 20b. The key package 50 associates each key label (Li) with a wrapped encryption key $(EK)^i$ comprising the encryption key (EK) wrapped with the public key (Ki) generated for the key label (Li), where the key servers 20a, 20b maintain the private keys (Ji) to unwrap the wrapped encryption keys $(EK)_{Ki}$. The key label (Li) associated with the wrapped encryption key (EK) may be maintained in metadata of the wrapped encryption key $(EK)^i$ or in some other metadata.

Figure 4:
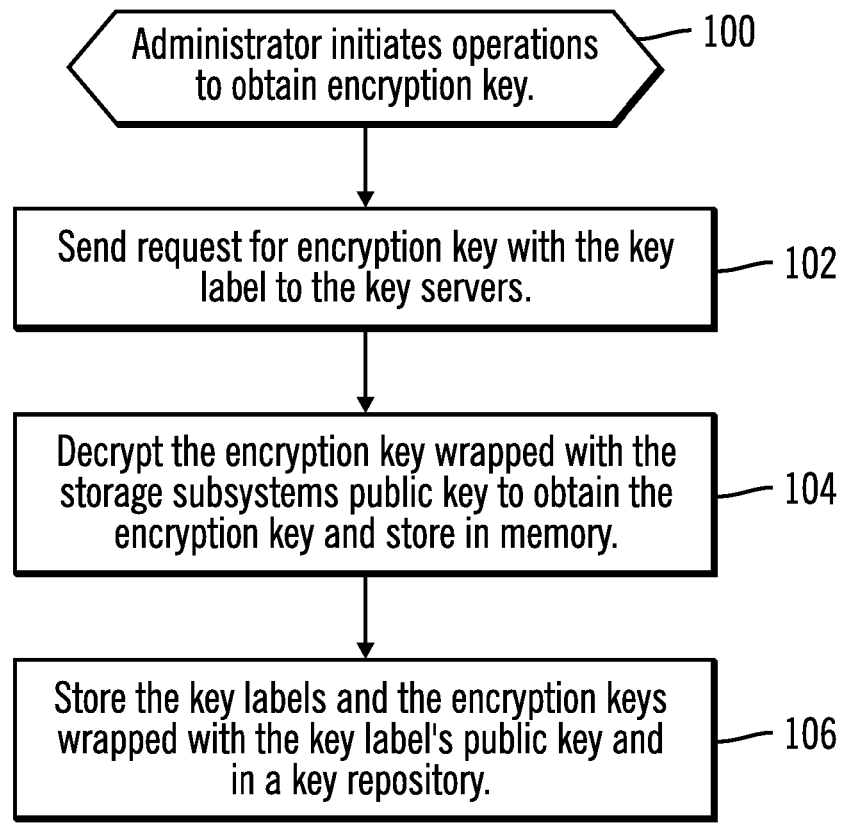
FIG. 4 illustrates an embodiment of operations to obtain an encryption key from the key server on request from a storage device.

FIG. 4 illustrates an embodiment of operations performed by the encryption services of the storage encryption manager 14 to obtain an encryption key 10 from the key servers 20a, 20b. Upon initiating (at block 100) an encryption group configuration operation, the storage encryption manager 14 sends (at block 102) a request for an encryption key with a key label string to each of the key servers 102 involved in the redundant key server system. The storage encryption manager 14 (at block 104) decrypts the encryption key wrapped with the storage subsystems public key to obtain the encryption key and store in memory and stores (at block 106) the encryption key 10, wrapped with the public key (Ki), and associated key label (Li) 34 received from the first key server that responds successfully to the request in the key repository 30 in the initialization disk 5. As discussed, the key servers 20a, 20b maintain the private keys (Ji) associated with key labels secret.

Figure 5:
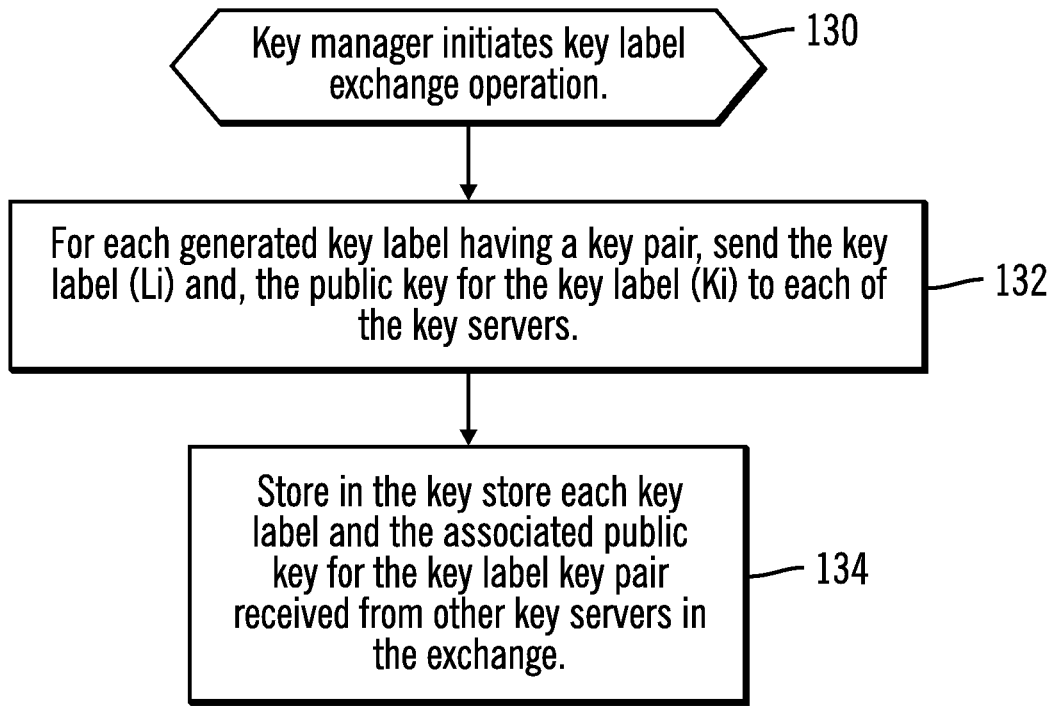
FIG. 5 illustrates an embodiment of operations of a key manager to exchange key labels and the associated public keys with other key servers.

FIG. 5 illustrates an embodiment of operations performed by the key managers 26a, 26b to exchange key labels they generated. Upon initiating (at block 130) key label exchange operations, for each key label (Li) having a generated key pair (Ji/Ki), the key manager 26a, 26b sends (at block 132) the key label (Li) and the public key (Ki) generated for the key label (Li) to each of the key servers 20a, 20b. The key manager 26a, 26b stores (at block 134) in the key store 24a, 24b each key label (Li) and the public key (Ki) of the key pair associated with the key label (Li). The key store entry 50 for key labels (Li) and public keys (Ki) received from other key servers 20a, 20b does not include the corresponding private key (Ji) of the key pair, which are kept secret in the key servers 20a, 20b in which the public/private key pair was generated.

Figure 6:
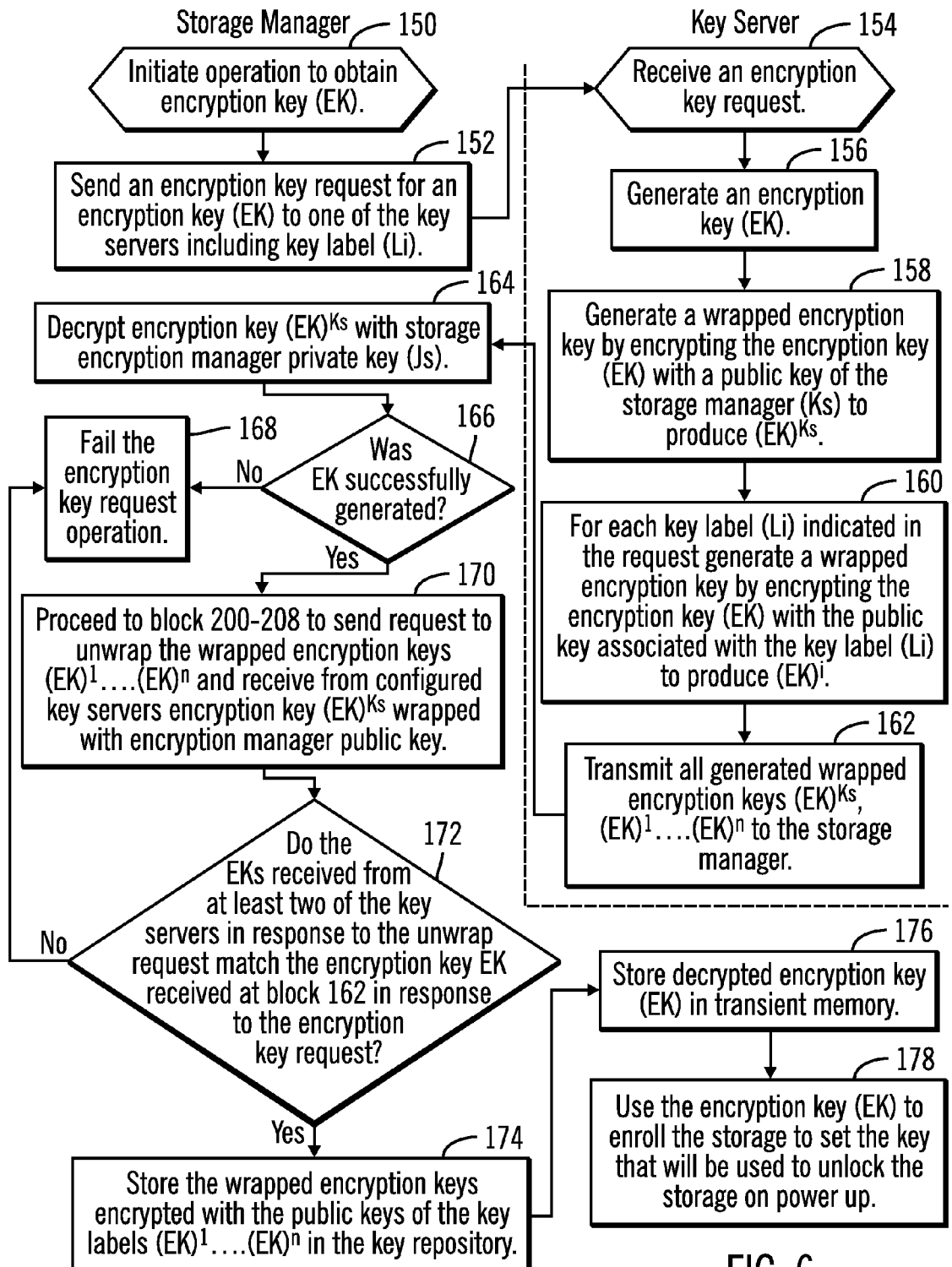
FIG. 6 illustrates an embodiment of operations of a storage subsystem and key server to provide the storage subsystem with an initial encryption key.

FIG. 6 illustrates an embodiment of operations performed by the storage encryption manager 14 and one of the key managers 26a, 26b to provide the storage encryption manager 14 with an initial encryption key (EK) 10 to use to lock and unlock the storage 4. Upon initiating (at block 150) an operation to obtain an encryption key (EK) 10, the storage encryption manager 14 sends (at block 152) an encryption key request for an encryption key (EK) to one of the key servers 20a, 20b including key labels (Ki), wherein the key labels (Li) included in the request match key labels configured on different key servers 20a, 20b. The key manager 26a, 26b of the selected key server 20a, 20b receives (at block 154) the encryption key request and generates (at block 156) an encryption key (EK) for the storage encryption manager 14 to use for encryption operations. The key manager 26a, 26b then generates (at block 158) a wrapped encryption key by encrypting the encryption key (EK) with the public key of the storage encryption manager 14 (Ks) 58 to produce $(EK)^{Ks}$, which is the wrapped encryption key the storage encryption manager 14 decrypts using its private key (Js) to obtain the encryption key 10 to use to unlock the storage 4. For each key label (Li) indicated in the request, the key manager 26a, 26b generates (at block 160) a wrapped encryption key by encrypting the encryption key (EK) with the public key (Ki) associated with the key label (Li) to produce $(EK)^i$. The key manager 26a, 26b generates wrapped encryption keys $(EK)^i$ for encryption keys 10 generated by the key manager 26a, 26b and for encryption keys generated by other key servers 20a, 20b received during the key label exchange operation. The key manager 26a, 26b transmits (at block 162) all the generated wrapped encryption keys $(EK)^{Ks}$, and $(EK)^1$ ... $(EK)^n$ to the storage encryption manager 14.

Upon receiving the wrapped encryption keys, the storage encryption manager 14 decrypts (at block 164) the received encryption key $(EK)^{Ks}$ with storage encryption manager private key (Js). If (at block 166) the encryption key (EK) was not successfully generated, then the storage encryption manager 14 fails (at block 168) the encryption key request operation. If the encryption key (EK) was successfully generated, then the storage encryption manager 14 proceeds (at block 170) to block 200 in FIG. 7 to initiate the operations at blocks 200-208 to send a request to unwrap the wrapped encryption keys $(EK)^1$ ... $(EK)^n$ to the configured key servers 20a, 20b and receive from the key servers 20, 20b encryption key $(EK)^{Ks}$ wrapped with the encryption manager public key (Ks). Upon receiving the encryption keys $(EK)^{Ks}$ from the key servers 20a, 20b wrapped with the encryption manager public key (Ks), the storage encryption manager 14 determines (at block 172) whether the encryption keys EKs received from at least two configured key servers 20a, 20b in response to the unwrap request match the encryption key EK received as part of the transmittal at block 162 in response to the encryption key request. If the unwrapped encryption keys from at least two configured key servers 20a, 20b do not match the encryption key (EK) received in response to the encryption key request or if there were any errors encountered during the unwrap request, such as any requested key server 20a, 20b failing to serve the newly generated encryption key, then the encryption key request operation is failed (at block 168). Otherwise, if there is a match with the encryption keys unwrapped and sent from the configured key servers 20a, 20b, then the storage encryption manager 14 stores (at block 174) the wrapped encryption keys encrypted with the public keys associated with the key labels $(EK)^1$ ... $(EK)^n$ in the key repository 30 in the initialization disk 5. The storage encryption manager 14 further stores (at block 176) the decrypted encryption key (EK) 10, decrypted at block 164, in transient storage or memory 6 so that the encryption key (EK) 10 is available to lock or unlock the storage 4, but unavailable after a power cycle event at the storage subsystem 2. The storage encryption manager 14 uses (at block 178) the encryption key (EK) 10 to enroll the storage 4 to set the key that will be used to unlock the storage 4 on power up.

The storage encryption manager requires that at least two (M of the N) key servers 20a, 20b successfully unwrap the encryption keys received in response to the initial encryption key request to ensure that redundant key servers are available in order to avoid deadlock. This ensures that the user will not begin using encryption until fully functioning redundant key server support is available.

Figure 7:
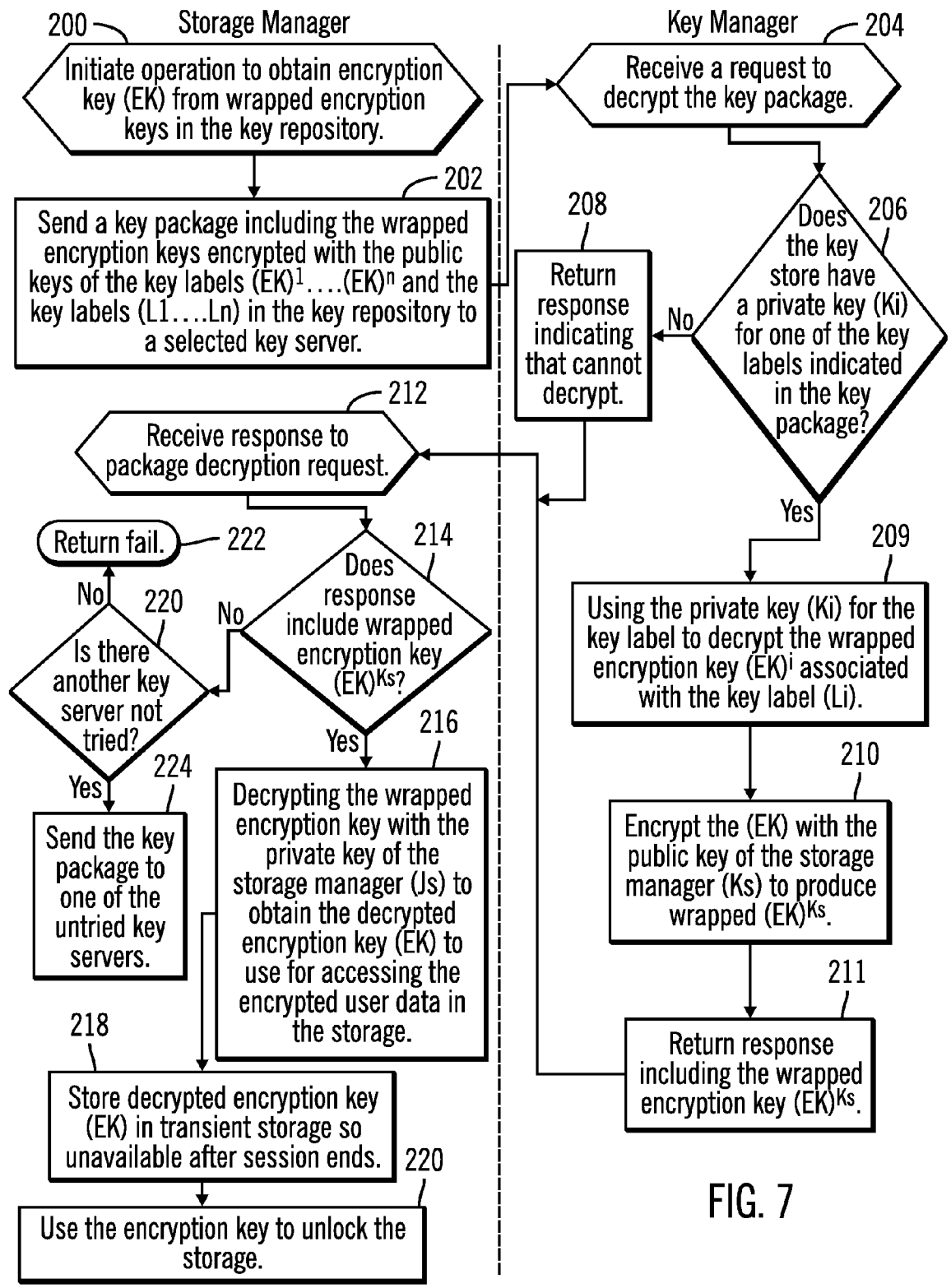
FIG. 7 illustrates an embodiment of operations of a storage subsystem and key server to provide the storage subsystem the encryption key from wrapped encryption keys in the key repository.

FIG. 7 illustrates an embodiment of operations performed by the storage encryption manager 14 and each of the key managers 26a, 26b to provide the storage encryption manager 14 with an encryption key (EK) 10 to use to lock and unlock the storage 4 from one of the stored encryption keys $(EK)^i$ in the key repository 30, which were encrypted with the public keys (Ki) associated with the key labels (Li). Upon initiating (at block 200) operations to obtain the encryption key (EK) 10 from the wrapped encryption keys $(EK)^i$ in the key repository 30, the storage encryption manager 14 sends (at block 202) a key package 70 (FIG. 3) including the wrapped encryption keys encrypted with the public keys of the key labels $(EK)^1 \ldots (EK)^n$ and the corresponding key labels (L1 ... Ln) in the key repository 30 to a selected one of the key servers 20a, 20b. As discussed, the key labels identify to the key server the public/private key pair the key server generated to encrypt the wrapped encryption key. Upon receiving (at block 204) a request to decrypt the key package 70, the selected key server 20a, 20b determines (at block 206) whether the key store 22a, 22b has a key store entry 50 having the private key (Ki) 56 for one of the key labels 52 indicated in the key package 70. If (at block 206) there is no key store entry 50 having a private key (Ki) 56 for one of the key labels in the package 70, then the key manager 26a, 26b returns (at block 208) a response indicating that the key server 20a, 20b cannot decrypt the received key package. If (at block 206) the key store 50 does have the private key (Ki) 56 for one of the key labels in the package 70, then the key manager 26a, 26b uses (at block 209) the determined private key (Ji) 56 for the key label (Li) in the package 70 to decrypt the wrapped encryption key $(EK)^i$ associated with the key label (Li). The key manager 26a, 26b then encrypts (at block 210) the (EK) with the public key of the storage encryption manager (Ks) 58 associated with the key label (Li) to produce the wrapped $(EK)^{Ks}$ to return (at block 211) in a response to the storage encryption manager 14.

Upon the storage encryption manager 14, receiving (at block 212) a response to the package decryption request, the storage encryption manager 14 determines (at block 214) whether the response includes the wrapped encryption key $(EK)^{Ks}$, encrypted with the storage subsystem 2 public key (Ks). If (at block 216) the response includes the wrapped encryption key $(EK)^{Ks}$, the storage encryption manager 14 decrypts (at block 216) the wrapped encryption key $(EK)^{Ks}$ with the private key of the storage subsystem (Js) from the key pair 8 to obtain the decrypted encryption key (EK) 10. The storage encryption manager 14 stores (at block 218) the decrypted encryption key (EK) in memory 6 to use for decryption/encryption operations with respect to the storage 4, where the encryption key (EK) 10 is unavailable after a power cycle, reboot, initialization event at the storage subsystem 2. The encryption key 10 may be stored in protected memory space that is not accessible to user processes, and requires special authority by the kernel to access. The encryption key 10 may be stored in the same classification of memory that customer data is stored prior to destage. The encryption key (EK) 10 is then used to unlock the storage 4 to make available for read and write operations. If (at block 214) the response does not include the wrapped encryption key $(EK)^{Ks}$, then the storage encryption manager 14 determines (at block 220) whether there is another key server 20a, 20b to which the package decryption request has not been sent. If there is no further key server 20a, 20b to try, then failure is returned 222. Otherwise, if there is another key server 20a, 20b to try the storage encryption manager 14 sends (at block 224) the key package 70 to one of the untried key servers 20a, 20b. Further, in certain embodiments, the storage encryption manager 14 may retry obtaining the encryption key if a response to the unwrap requests indicates a key server is unavailable in order to allow for intermittent failures in the key servers, such as a floor power outage scenario in which key servers and subsystems are both coming online at the same time, and the subsystem sends the unwrap request before the key server is ready to service such a request.

Figure 8:
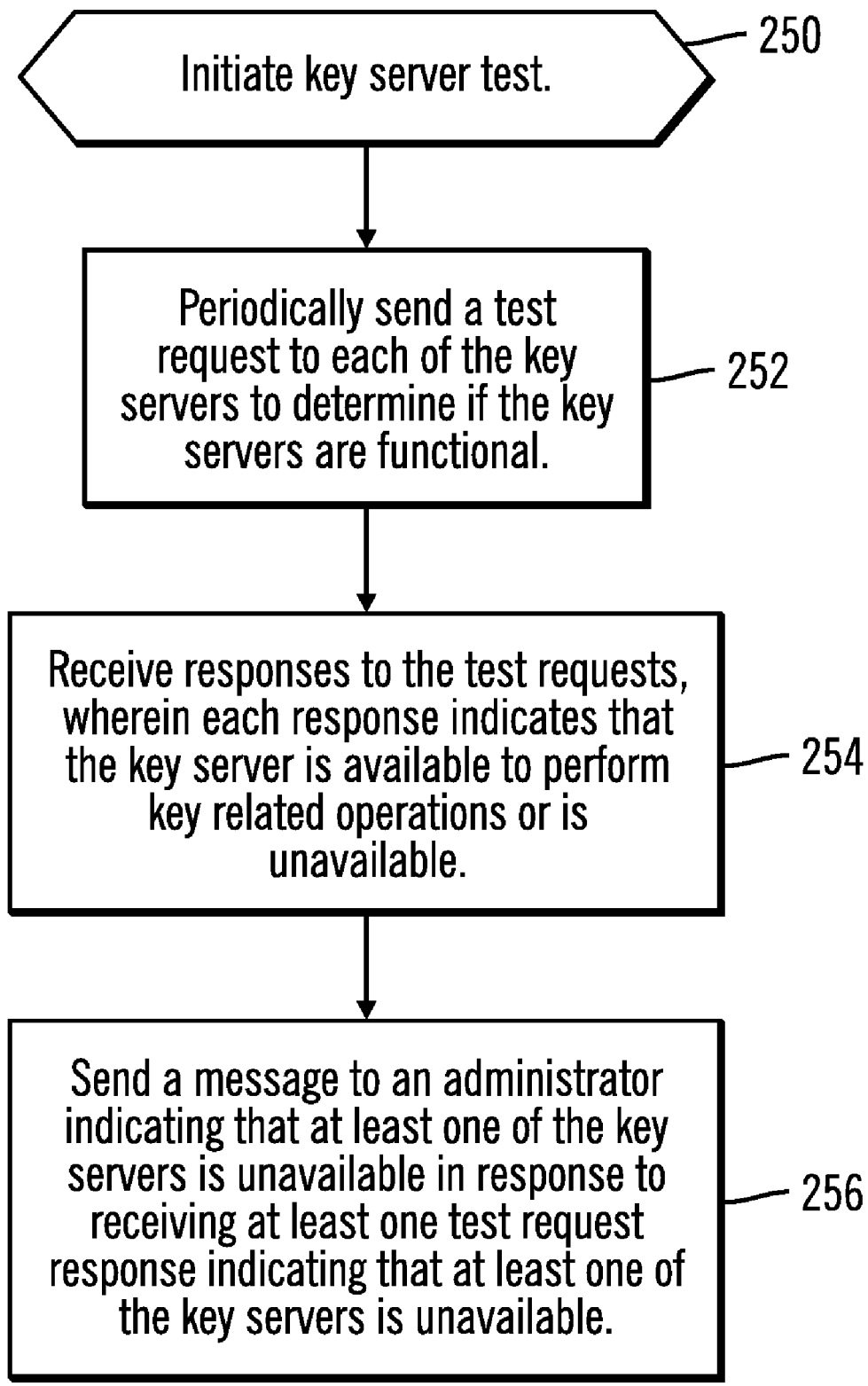
FIG. 8 illustrates an embodiment of operations to determine the availability of key servers.

FIG. 8 illustrates an embodiment of operations performed by the storage encryption manager 14 encryption services, or another component, to perform a periodic key server 20a, 20b test to check if redundant key servers 20a, 20b are available to determine the available redundancy of the system. Upon initiating (at block 250) the key server test, the storage encryption manager 14 (or other component) periodically sends (at block 252) a test request to each of the key servers 20a, 20b to determine if the key servers are functional. The storage encryption manager 14 then receives (at block 24) responses to the test requests, where each response indicates that the key server is available to perform key related operations or is unavailable. The storage encryption manager 14 (or other component) sends (at block 256) a message to an administrator indicating that at least one of the key servers 20a, 20b is unavailable in response to receiving at least one test request response indicating that at least one of the key servers is unavailable. The response indicating unavailability may comprise a message from the key server indicating unavailability or a message indicating that the test request message to the key server was undelivered.

In one embodiment, to determine whether the key servers are working properly, the key signatures of the "encryption keys" received from the key servers are validated against a known key signature received at encryption group configuration time (when the encryption key is requested to be created) or system initialization time. If a key server does not successfully serve the keys to the storage encryption key manager 14, an error is logged and the customer is notified so he can correct the situation.

With the described embodiments, a storage subsystem 2 receives an encrypted encryption key from different key servers 20a, 20b so that the encrypted encryption key may be encrypted by any one of multiple key servers 20a, 20b having the private key capable of decrypting the encrypted encryption key. This ensures that if one key server is down or non-functioning, then the encryption key may be obtained from another key server to avoid a single point of failure. Further, with the described embodiments, an administrator is alerted if any of the key servers used in the redundant key server environment has failed to determine if corrective action needs to be taken to restore a redundant key server environment.

The ability to configure more than one key server platform may be used to configure at least one key server platform with locally attached non-encrypted storage for persistently storing any program and data objects required to make the key server operational. Such a key server platform should be resilient to a condition referred to as an encryption deadlock where the key server cannot become operational because one or more of its program or data objects is stored on encrypted storage that requires a key server in order to become accessible. Other key server platforms may also been needed to provision sufficient key servers where the other platforms may be subject to encryption deadlocks (e.g. they do not necessarily have locally attached non-encrypted storage such that program or data objects required to make the key server operational may inadvertently have been located on encrypted storage dependent on a key server to become accessible).

The described embodiments of a redundant key server encryption environment may also be deployed in environments when at least two sets of key servers maintain their private keys in secret, such as using a HSM (hardware security module), or when key servers are deployed in different hardware platforms such that at least one platform does not support interchange of private keys in a secure manner with one or more of the other hardware platforms.

In described embodiments, the encryption key (EK) was used to lock and unlock a storage drive, such as a hard disk drive. In alternative embodiments, the encryption key (EK) may be used to encrypt and decrypt data to a tape drive or a hard disk drive.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 2-8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product implemented in a key server to communicate with at least one remote key server and at least one device to provide an encryption key, the computer program product comprising a computer readable storage medium having computer readable program code embodied therein that executes to perform operations, the operations comprising:
    transmitting public keys associated with the key server and the at least one device to the at least one remote key server;
    receiving from the at least one remote key server public keys associated with the at least one remote key server;
    receiving a request for an encryption key from a requesting device comprising one of the at least one device;
    generating the encryption key for use by the requesting device to unlock a storage;
    generating a first wrapped encryption key by encrypting the encryption key with a requesting device public key associated with the requesting device;
    generating a second wrapped encryption key by encrypting the encryption key with a public key associated with the key server;
    generating at least one additional wrapped encryption key for each of the at least one remote key server by encrypting the encryption key with the at least one public key provided by the at least one remote key server; and
    transmitting, to the requesting device, the first, second and the at least one additional wrapped encryption key to the requesting device.

2. The computer program product of claim 1, wherein the public keys managed by the key server and the at least one remote key server are associated with key labels, wherein the key server and the at least one remote key server maintain the key labels for the public keys they generated and received, wherein the request from the requesting device indicates one key label associated with the key server and at least one key label associated with the at least one public key provided by the at least one remote key server, and wherein each additional wrapped encryption key is wrapped with the public key associated with each key label indicated in the request from the requesting device.

3. The computer program product of claim 1, wherein the key server and the at least one remote key server maintain private keys to decrypt data encrypted with the public keys they generated and transmitted to each of the key server and the at least one remote key server and wherein each of the key server and the at least one remote key server do not include the private keys for the at least one public key received from other key servers, wherein the operations further comprise:
    receiving from one of the requesting device or another device, a package including multiple wrapped encryption keys comprising the encryption key or another encryption key wrapped with different public keys;
    determining whether the key server maintains a private key for one of the wrapped encryption keys included in the package; and
    sending a message to the requesting device indicating that the key server cannot decrypt the encryption key included in the package in response to determining that the key server does not maintain the private key for one of the wrapped encryption keys.

4. The computer program product of claim 3, wherein the operations further comprise:
    decrypting one of the wrapped encryption keys wrapped by a public key for which the key server maintains the private key in response to determining that the key server maintains the private key for one of the wrapped encryption keys to obtain the decrypted encryption key; and
    encrypting the decrypted encryption key with a device public key associated with the device that initiated the creation of the public and private key maintained by the key server providing the package, wherein the device maintains a device private key to decrypt data encrypted with the device public key used to encrypt the decrypted encryption key; and
    returning the encrypted encryption key to the device providing the package.

5. The computer program product of claim 3 wherein the public keys managed by the key server and the at least one remote key server are associated with key labels, wherein the key server and the at least one remote key server maintain the key labels for the public keys they generated, wherein the package indicates the key labels of the public keys used to encrypt the wrapped encryption keys in the package, and wherein the key server determines whether there is a private key for one of the wrapped encryption keys by determining whether there is the private key for one of the key labels indicated in the package.

6. A computer program product implemented in a device to communicate with at least two key servers and to obtain an encryption key, the computer program product comprising a computer readable storage medium having computer readable program code embodied therein that executes to perform operations, the operations comprising:

sending an encryption key request for an encryption key to use to a selected key server comprising one of the at least two key servers;

receiving, from the selected key server, a first wrapped encryption key comprising an encryption key encrypted with a device public key for which the device has a device private key to decrypt data encrypted with the device public key, a second wrapped encryption key comprising the encryption key encrypted with a public key for which the selected key server maintains a corresponding private key, and at least one additional wrapped encryption key encrypted with a public key for which the key server other than the selected key server has a corresponding key server private key; and decrypting the first wrapped encryption key to obtain the encryption key decrypted to use for encryption operations.

7. The computer program product of claim 6, wherein the operations further comprise sending unwrap key requests to the at least two key servers including the second and the at least one additional wrapped encryption keys, wherein the key servers receiving the key requests decrypt one of the wrapped encryption keys and encrypt the unwrapped encryption key with the device public key;

receiving the encryption keys encrypted with the device public key from the at least two key servers;

decrypting the encryption key encrypted with the device public key that was received in response to the encryption key request;

comparing the encryption key received in response to the encryption key request from the selected key server to the encryption keys received in response to the unwrap request to determine if they match; and failing the encryption key request if the encryption key received in response to the encryption key request does not match two of the encryption keys received in response to the unwrap request.

8. The computer program product of claim 6, wherein the operations further comprise:

using the encryption key to unlock a storage;

writing data to the storage; and writing the second and additional wrapped encryption keys to an initialization disk.

9. The computer program product of claim 6, wherein the selected key server comprises a first selected key server, wherein the operations further comprise:

sending a package including the second and additional wrapped encryption keys to the at least two key servers; and receiving a response to sending the package comprising the encryption key encrypted with the device public key or another encryption key wrapped with different public keys.

10. The computer program product of claim 9, wherein the operations further comprise:

receiving from the second selected key server a message indicating that the second selected key server cannot decrypt one of the wrapped encryption keys in the package; and sending the package to one of the key servers other than the at least one key server to which the package was already sent that was unable to decrypt the wrapped encryption keys in the package.

11. The computer program product of claim 6, wherein the operations further comprise:

periodically sending a test request to each of the key servers to determine if the key servers are functional;

receiving test request responses to the test requests from the key servers, wherein each test request response indicates whether the key server is available to perform key related operations or is unavailable; and sending a message to an administrator indicating that at least one of the key servers is unavailable in response to receiving at least one test request response indicating that at least one of the key servers is unavailable.

12. A system in communication with at least one device and at least one remote key server, comprising:

a computer readable storage medium having a key store including public keys;

a key manager in communication with the computer readable storage medium and executing instructions to perform operations, the operations comprising:

transmitting the public keys in the key store associated with the key server and at least one device to at least one remote key server, wherein the transmitted public keys are associated with the key manager and the at least one device;

receiving from the at least one remote key server public keys associated with the at least one remote key server;

receiving a request for an encryption key from a requesting device comprising one of the at least one device;

generating the encryption key for use by the requesting device to unlock a storage;

generating a first wrapped encryption key by encrypting the encryption key with a requesting device public key associated with the requesting device;

generating a second wrapped encryption key by encrypting the encryption key with a public key associated with the key server;

generating at least one additional wrapped encryption key for each of the at least one remote key server by encrypting the encryption key with the at least one public key provided by the at least one remote key server; and transmitting, to the requesting device, the first, second and the at least one additional wrapped encryption key to the requesting device.

13. The system of claim 12, wherein the public keys managed by the key server and the at least one remote key server are associated with key labels, wherein the key server and the at least one remote key server maintain the key labels for the public keys they generated and received, wherein the request from the requesting device indicates one key label associated with the key server and at least one key label associated with the at least one public key provided by the at least one remote key server, and wherein each additional wrapped encryption key is wrapped with the public key associated with each key label indicated in the request from the requesting device.

14. The system of claim 12, wherein the key server and the at least one remote key server maintain private keys to decrypt data encrypted with the public keys they generated and transmitted to each of the key server and the at least one remote key server and wherein each of the key server and the at least one remote key server do not include the private keys for the at least one public key received from other key servers, wherein the operations further comprise:

receiving, by the key server, from one of the requesting device or another device, a package including multiple wrapped encryption keys comprising the encryption key or another encryption key wrapped with different public keys;

determining, by the key server, whether the key server maintains a private key for one of the wrapped encryption keys included in the package; and sending, by the key server, a message to the requesting device indicating that the key server cannot decrypt the encryption key included in the package in response to determining that the key server does not maintain the private key for one of the wrapped encryption keys.

15. The system of claim 14, wherein the operations further comprise:

decrypting one of the wrapped encryption keys wrapped by a public key for which the key server maintains the private key in response to determining that the key server maintains the private key for one of the wrapped encryption keys to obtain the decrypted encryption key;

encrypting the decrypted encryption key with a device public key associated with the device that initiated the creation of the public and private key maintained by the key server providing the package, wherein the device maintains a device private key to decrypt data encrypted with the device public key used to encrypt the decrypted encryption key; and returning the encrypted encryption key to the device providing the package.

16. The system of claim 14 wherein the public keys managed by the key server and the at least one remote key server are associated with key labels, wherein the key server and the at least one remote key server maintain the key labels for the public keys they generated, wherein the package indicates the key labels of the public keys used to encrypt the wrapped encryption keys in the package, and wherein the key server determines whether there is a private key for one of the wrapped encryption keys by determining whether there is the private key for one of the key labels indicated in the package.

17. A system in communication with at least two key servers for obtaining an encryption key, comprising:

a computer readable storage medium having a storage encryption manager executed to perform operations, the operations comprising:

sending an encryption key request for an encryption key to use to a selected key server comprising one of the at least two key servers;

receiving, from the selected key server, a first wrapped encryption key comprising an encryption key encrypted with a device public key for which the device has a device private key to decrypt data encrypted with the device public key, a second wrapped encryption key comprising the encryption key encrypted with a public key for which the selected key server maintains a corresponding private key, and at least one additional wrapped encryption key encrypted with a public key for which the key server other than the selected key server has a corresponding key server private key; and decrypting the first wrapped encryption key to obtain the encryption key decrypted to use for encryption operations.

18. The system of claim 17, wherein the operations further comprise sending unwrap key requests to the at least two key servers including the second and the at least one additional wrapped encryption keys, wherein the key servers receiving the key requests decrypt one of the wrapped encryption keys and encrypt the unwrapped encryption key with the device public key;

receiving the encryption keys encrypted with the device public key from the at least two key servers;

decrypting the encryption key encrypted with the device public key that was received in response to the encryption key request;

comparing the encryption key received in response to the encryption key request from the selected key server to the encryption keys received in response to the unwrap request to determine if they match; and failing the encryption key request if the encryption key received in response to the encryption key request does not match two of the encryption keys received in response to the unwrap request.

19. The system of claim 17, wherein the operations further comprise:

using the encryption key to unlock a storage;

writing data to the storage; and writing the second and additional wrapped encryption keys to an initialization disk.

20. The system of claim 17, wherein the selected key server comprises a first selected key server, wherein the operations further comprise:

sending a package including the second and additional wrapped encryption keys to the at least two key servers; and receiving a response to sending the package comprising the encryption key encrypted with the device public key or another encryption key wrapped with different public keys.

21. The system of claim 20, wherein the operations further comprise:

receiving from the second selected key server a message indicating that the second selected key server cannot decrypt one of the wrapped encryption keys in the package; and sending the package to one of the key servers other than the at least one key server to which the package was already sent that was unable to decrypt the wrapped encryption keys in the package.

22. The system of claim 17, wherein the operations further comprise:

periodically sending a test request to each of the key servers to determine if the key servers are functional;

receiving test request responses to the test requests from the key servers, wherein each test request response indicates whether the key server is available to perform key related operations or is unavailable; and sending a message to an administrator indicating that at least one of the key servers is unavailable in response to receiving at least one test request response indicating that at least one of the key servers is unavailable.

* * * * *